US009649917B2

(12) United States Patent
Ikeda et al.

(10) Patent No.: US 9,649,917 B2
(45) Date of Patent: May 16, 2017

(54) VEHICLE RESIN BACK DOOR STRUCTURE

(71) Applicant: TOYOTA JIDOSHA KABUSHIKI KAISHA, Toyota-shi, Aichi-ken (JP)

(72) Inventors: Koki Ikeda, Toyota (JP); Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/813,973

(22) Filed: Jul. 30, 2015

(65) Prior Publication Data

US 2016/0031299 A1 Feb. 4, 2016

(30) Foreign Application Priority Data

Jul. 30, 2014 (JP) ................................. 2014-155362

(51) Int. Cl.
 *B60J 5/10* (2006.01)
(52) U.S. Cl.
 CPC ............... *B60J 5/107* (2013.01); *B60J 5/102* (2013.01)
(58) Field of Classification Search
 CPC ....................................................... B60J 5/107
 USPC ................................. 296/56, 146.11, 146.12
 See application file for complete search history.

(56) References Cited

U.S. PATENT DOCUMENTS

| 4,773,700 | A | | 9/1988 | Sannomiya |
|---|---|---|---|---|
| 5,095,582 | A | * | 3/1992 | Ohlsson .......................... 16/235 |
| 5,876,086 | A | * | 3/1999 | Lagrou et al. ........... 296/146.11 |
| 6,000,747 | A | * | 12/1999 | Sehgal et al. ............... 296/146.8 |
| 8,550,536 | B2 | * | 10/2013 | Gachter et al. ............ 296/146.8 |
| 8,567,841 | B2 | * | 10/2013 | Ginestet et al. ................. 296/56 |
| 8,690,220 | B2 | * | 4/2014 | Tsukiyama et al. ............ 296/56 |
| 8,746,777 | B2 | * | 6/2014 | Iwano et al. ............. 296/146.11 |
| 2006/0290169 | A1 | | 12/2006 | Fukushima et al. |
| 2014/0167446 | A1 | * | 6/2014 | Iwano et al. ............... 296/146.8 |
| 2015/0210147 | A1 | * | 7/2015 | Kodama .................. 296/146.11 |

FOREIGN PATENT DOCUMENTS

| EP | 0044649 A1 | | 1/1982 |
|---|---|---|---|
| JP | 2010100227 A | | 5/2010 |
| JP | 2010188792 A | | 9/2010 |
| JP | 2011-136606 A | | 7/2011 |
| JP | 2013-112132 A | * | 6/2013 |
| JP | 2014-076707 A | | 5/2014 |
| WO | 2013/080003 A1 | | 6/2013 |

* cited by examiner

*Primary Examiner* — Jerry Redman
(74) *Attorney, Agent, or Firm* — Oliff PLC

(57) ABSTRACT

A vehicle resin back door structure includes a back door panel made of resin, which has a first opening, and of which a marginal edge portion that forms the first opening is formed in a closed sectional shape; a bracket made of metal, which is fixed inside the closed section of the marginal edge portion, and of which a portion is exposed by a second opening formed in the marginal edge portion; and a back window glass of which a peripheral edge portion is joined to the marginal edge portion including the portion of the bracket that is exposed by the second opening.

5 Claims, 3 Drawing Sheets

VEHICLE RESIN BACK DOOR STRUCTURE

INCORPORATION BY REFERENCE

The disclosure of Japanese Patent Application No. 2014-155362 filed on Jul. 30, 2014 including the specification, drawings and abstract is incorporated herein by reference in its entirety.

BACKGROUND OF THE INVENTION

1. Field of the Invention

The invention relates to a vehicle resin back door structure.

2. Description of Related Art

Japanese Patent Application Publication No. 2014-76707 (JP 2014-76707 A), for example, describes a vehicle resin back door structure that includes a resin back door panel in which an opening is formed, and a back window glass of which a peripheral edge portion is joined to the periphery of the opening so as to cover the opening of the back door panel.

With such a vehicle resin back door structure, it is desirable to improve the rigidity of the back door panel, as well as improve the adhesive strength between the periphery (i.e., the marginal edge portion) of the opening formed in the back door panel and the peripheral edge portion of the back window glass, and there is still room for improvement with a structure for improving these.

SUMMARY OF THE INVENTION

Therefore, the invention provides a vehicle resin back door structure capable of both improving the rigidity of a back door panel made of resin, and improving the adhesive strength between this back door panel and a back window glass.

A first aspect of the invention relates to a vehicle resin back door structure that includes a back door panel made of resin, which has a first opening, and of which a marginal edge portion that forms the first opening is formed in a closed sectional shape; a bracket made of metal, which is fixed inside the closed section of the marginal edge portion, and of which a portion is exposed by a second opening formed in the marginal edge portion; and a back window glass of which a peripheral edge portion is joined to the marginal edge portion including the portion of the bracket that is exposed by the second opening.

According to this aspect, the marginal edge portion that forms the first opening of the back door panel is formed in a closed sectional shape. Therefore, the rigidity of the back door panel that is made of resin is able to be improved compared to a structure in which the marginal edge portion is formed in an open sectional shape. Also, the bracket that is made of metal is fixed inside the closed section of the marginal edge portion, and a portion of the bracket is exposed by the second opening formed in the marginal edge portion. Also, when the peripheral edge portion of the back window glass is joined to the marginal edge portion, the peripheral edge portion of the back window glass is also joined to the portion of the bracket that is exposed by this second opening. Therefore, the adhesive strength between the resin back door panel and the back window glass is able to be improved.

According to this aspect, both the rigidity of the back door panel that is made of resin, and the adhesive strength between this back door panel and the back window glass, are able to be improved.

Also, in the aspect described above, the second opening may be formed on a joining portion of the marginal edge portion to which the peripheral edge portion of the back window glass is joined.

According to this structure, the second opening is formed on a joining portion of the marginal edge portion to which the peripheral edge portion of the back window glass is joined. Therefore, the structure of the marginal edge portion of the resin back door panel is able to be simplified, compared to a structure in which the second opening is not formed on the joining portion of the marginal edge portion.

According to the structure described above, the structure of the marginal edge portion of the resin back door panel is able to be simplified.

Also, in the aspect described above, a plurality of the brackets may be fixed inside the closed section of the marginal edge portion.

According to this structure, a plurality of the brackets are fixed inside the closed section of the marginal edge portion. Therefore, the adhesive strength between the resin back door panel and the back window glass is able to be efficiently improved compared to a structure in which only one bracket is fixed inside the closed section of the marginal edge portion.

According to the structure described above, the adhesive strength between the resin back door panel and the back window glass is able to be efficiently improved.

Also, in the aspect described above, the bracket may be fixed by a mechanical fastening inside the closed section of the marginal edge portion.

According to this structure, the bracket is fixed by a mechanical fastening inside the closed section of the marginal edge portion. Therefore, the strength with which the bracket is fixed to the resin back door panel is able to be improved, compared to a structure in which the bracket is not fixed by a mechanical fastening inside the closed section of the marginal edge portion.

According to the structure described above, the strength with which the bracket is fixed to the resin back door panel is able to be improved.

Also, in the aspect described above, the second opening may be a hole.

According to this structure, the second opening is a hole. Therefore, a reduction in rigidity of the marginal edge portion of the resin back door panel is suppressed compared to a structure in which the second opening is a notched portion.

According to the structure described above, a reduction in rigidity of the marginal edge portion of the resin back door panel is able to be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
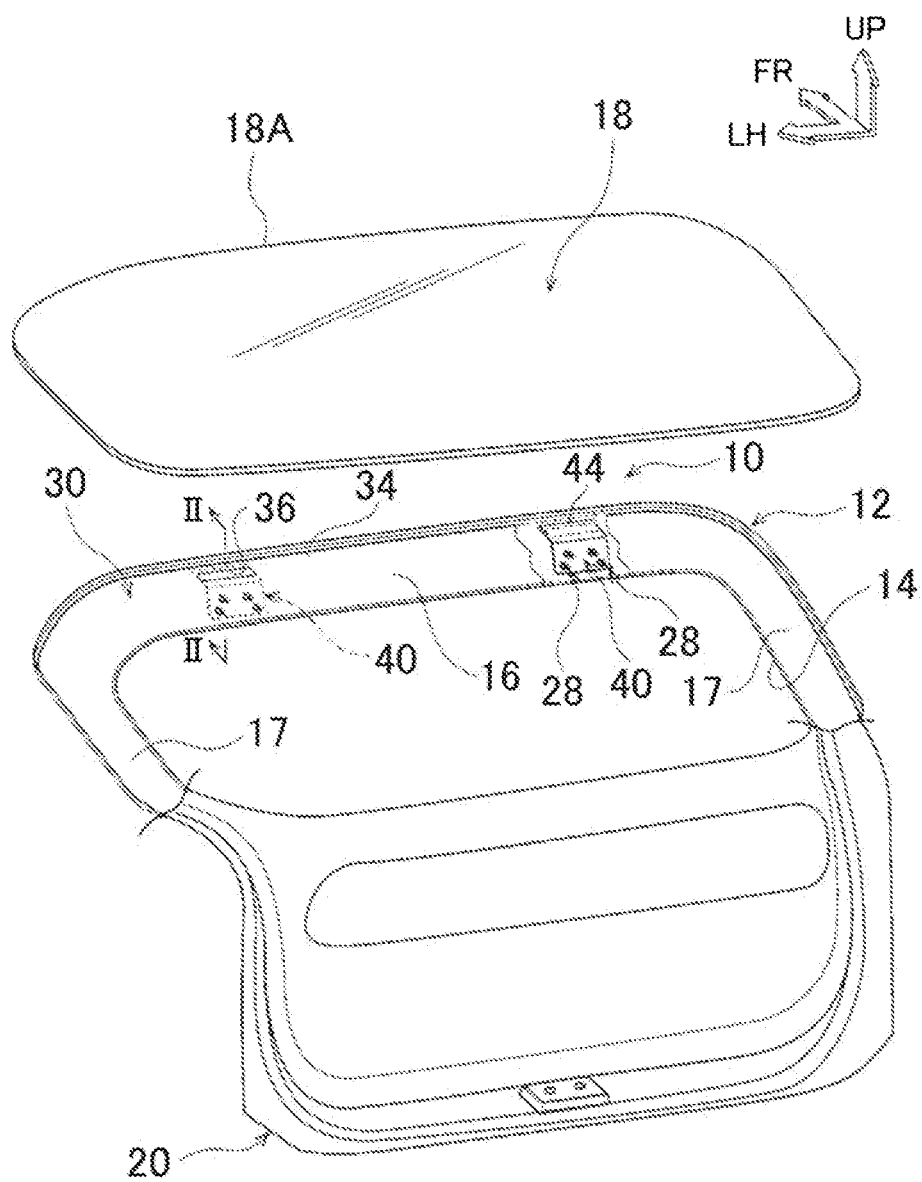
FIG. 1 is a perspective view of a vehicle resin back door structure according to one example embodiment of the invention.

Hereinafter, example embodiments of the invention will be described in detail with reference to the accompanying drawings. To simplify the description, in the drawings, arrow UP indicates a vehicle upward direction, arrow FR indicates a direction toward the front of the vehicle, and arrow LH indicates a direction toward the left of the vehicle. Also, unless otherwise specified, when directions of up and down, front and rear, and left and right are used, they indicate up and down in the vehicle up-down (vertical) direction, front and rear in the vehicle front-rear (longitudinal) direction, and left and right in the vehicle left-right direction (vehicle width direction), respectively.

As shown in FIG. 1, a substantially rectangular opening (a first opening) 14 where a back window glass 18 is provided, is formed on an upper portion side of a resin back door panel 12 that forms a vehicle resin back door structure 10. The back door panel 12 is formed by a resin inner panel 20 and a resin outer panel 30 that are joined together. At least a marginal edge portion 16 on an upper side and marginal edge portions 17 on both sides that form the first opening 14 are formed in a closed sectional shape.

With the back door panel 12 in FIG. 1, an outer panel 30 is shown only on the marginal edge portion 16 on the upper side and the marginal edge portions 17 on both sides. Also, the inner panel 20 and the outer panel 30 are both made of carbon fiber reinforced resin material (CFRP), for example. Also, the structures of the marginal edge portion 16 on the upper side and the marginal edge portions 17 on both sides are the same, so hereinafter the marginal edge portion 16 on the upper side will be described as an example.

Figure 2:
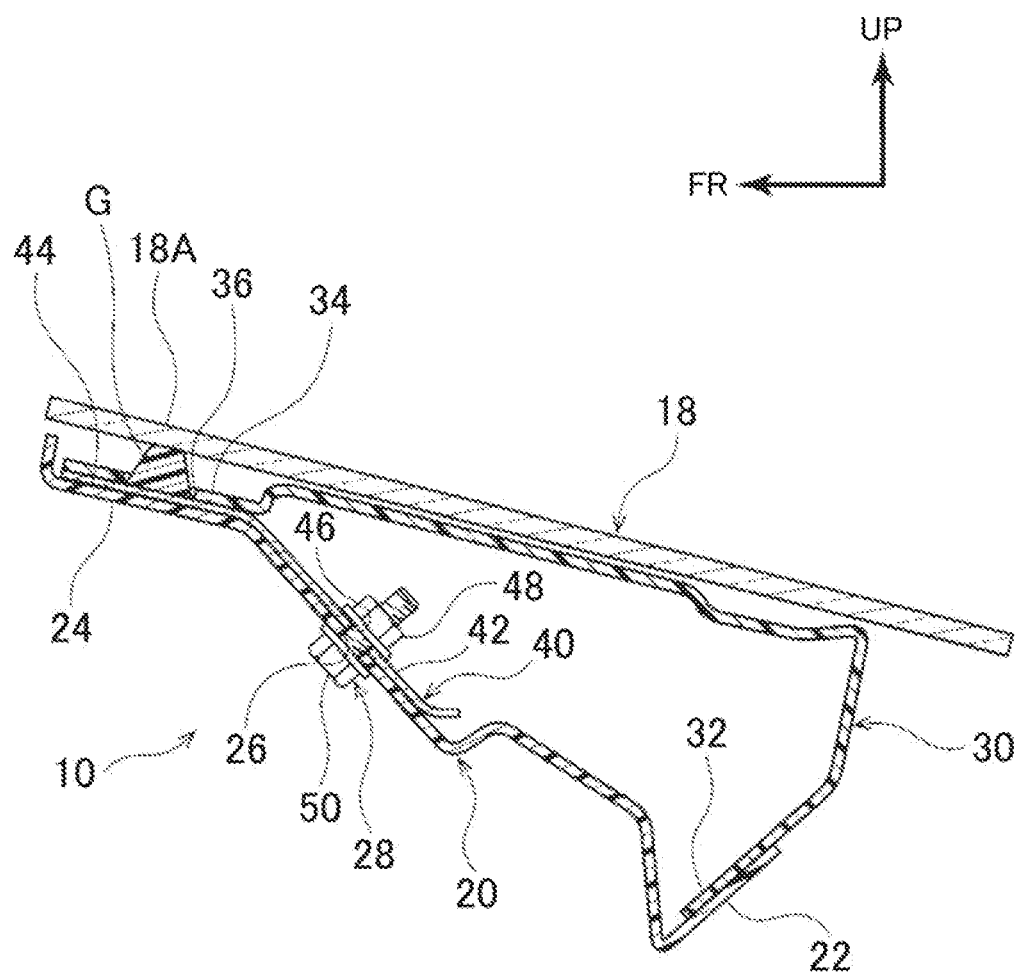
FIG. 2 is a sectional view take along line II-II in FIG. 1 shown together with a back window glass.

As shown in FIG. 2, the marginal edge portion 16 of the back door panel 12 is formed in a closed sectional shape, when viewed from the vehicle width direction. That is, a rear end portion 32 of the outer panel 30 is overlapped with a rear end portion 22 of the inner panel 20, and joined thereto by a rivet or an adhesive or the like. Also, a front end portion 44 of a bracket 40, which will be described later, and a front end portion 34 of the outer panel 30 are overlapped in order with a front end portion 24 of the inner panel 20, and these are joined together by a rivet or an adhesive or the like.

Figure 3:
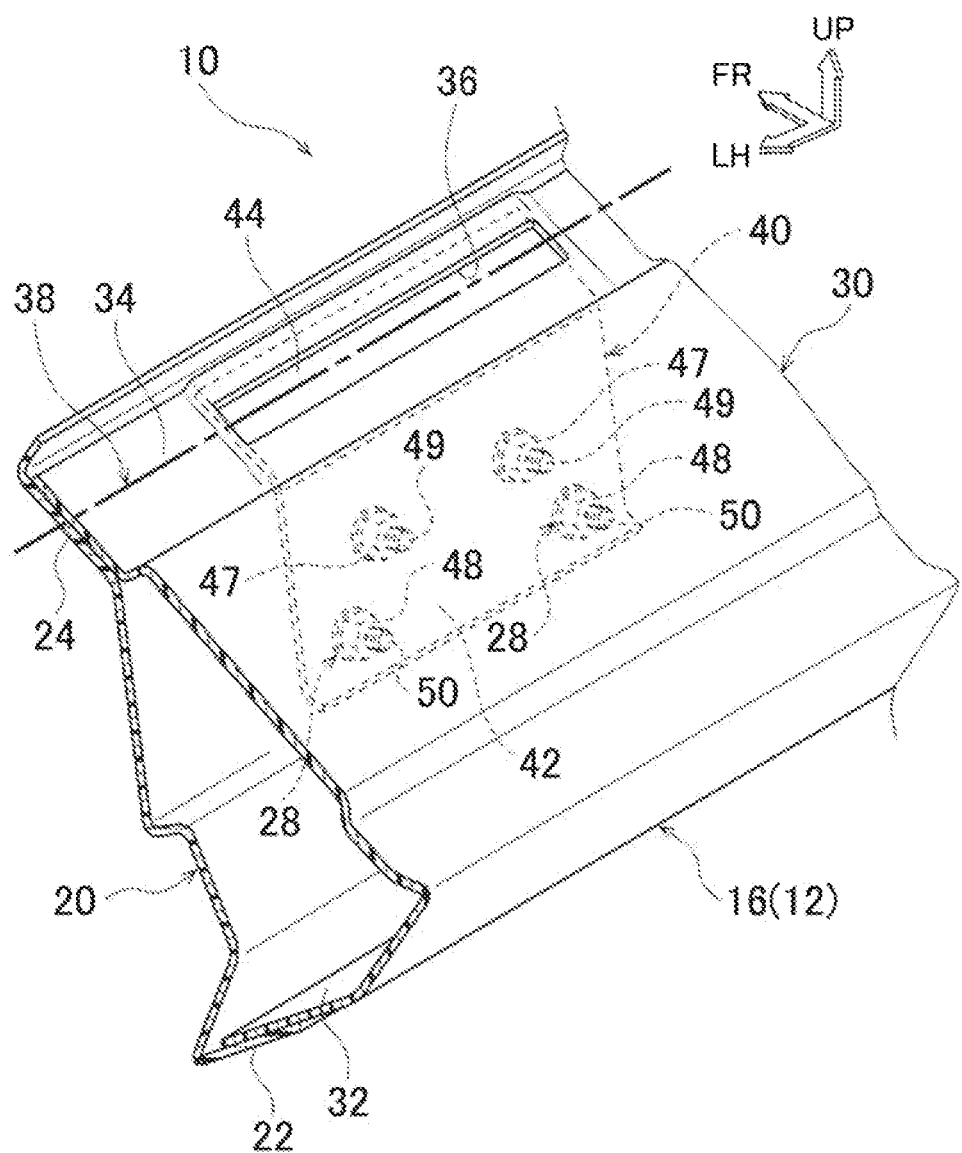
FIG. 3 is an enlarged perspective view of a portion of the vehicle resin back door structure according to the example embodiment of the invention.

Also, a bracket 40 made of metal (e.g., iron) is fixed by a mechanical fastening such as a bolt (or rivet) to a front side portion of the inner panel 20 of the marginal edge portion 16, as shown in FIGS. 1 to 3. More specifically, a through-hole 46 through which a bolt 50 is inserted is formed in a rear end portion 42 of the bracket 40, and a weld nut 48 is provided on the same axis as the through-hole 46, on an upper surface side of the rear end portion 42. Also, a through-hole 26 through which the bolt 50 is inserted is also formed in the inner panel 20.

Therefore, the bracket 40 is fastened and fixed to the inner panel 20 by the bracket 40 being arranged overlapping with the upper surface side (i.e., the side inside the closed section) of the inner panel 20, and the bolt 50 being inserted through the through-hole 26 and the through-hole 46 from the vehicle lower side and screwed into the weld nut 48. A fastening portion 28 (the through-holes 26 and 46) formed by the bolt 50 and the weld nut 48 is provided in two locations in the vehicle width direction, as shown in FIG. 3, but this fastening portion 28 may also be provided in only one location or in three or more locations depending on the length of the bracket 40 in the vehicle width direction.

Also, this bracket 40 is fastened and fixed to the inner panel 20 before the outer panel 30 is joined to the inner panel 20, as shown in FIG. 2. Also, the bracket 40 is formed in a generally rectangular plate shape, and a front end portion 44 of this bracket 40 extends toward the vehicle front side so as to overlap with the front end portion 24 of the inner panel 20.

A hinge portion, not shown, for attaching the back door panel 12 to a vehicle body, also not shown, is bolted via the inner panel 20 to the rear end portion 42 of the bracket 40. Therefore, a weld nut 47 and a bolt 49 for fastening the hinge portion are shown in FIG. 3.

Also, a hole (a second opening) 36 for exposing a portion of the front end portion 44 of the bracket 40 is formed in the front end portion 34 of the outer panel 30, as shown in FIG. 3. This hole 36 is formed in a rectangular shape in which the vehicle width direction is the length direction, for example, and is formed above a linear joining portion 38 (shown by the dashed line) of the marginal edge portion 16 (the front end portion 34 of the outer panel 30) that joins a peripheral edge portion 18A (see FIG. 1) of the back window glass 18.

That is, the joining portion 38 is a portion where an adhesive G shown in FIG. 2 is applied linearly in the length direction of the marginal edge portion 16, and the hole 36 is formed along this joining portion 38. Therefore, when joining the peripheral edge portion 18A of the back window glass 18 to the joining portion 38 of the marginal edge portion 16 (i.e., the front end portion 34 of the outer panel 30) of the back door panel 12 by the adhesive G, this peripheral edge portion 18A is also joined by the adhesive G to a portion of the front end portion 44 of the bracket 40 that is exposed by the hole 36.

Next, the operation of the vehicle resin back door structure 10 having this kind of structure will be described.

The inner panel 20 and the outer panel 30 that form the back door panel 12 are both made of carbon fiber reinforced resin material (CFRP) or the like, as shown in FIG. 2. Therefore, the back door panel 12 is able to have higher strength and be lighter in weight. Also, the marginal edge portions 16 and 17 of the back door panel 12 are formed in closed sectional shapes. Therefore, the rigidity of the back door panel 12 is able to be improved compared to when the marginal edge portions 16 and 17 of the back door panel 12 are formed in open sectional shapes.

Also, the metal bracket 40 for fastening the hinge portion is fixed by a mechanical fastening to the inner panel 20 inside the closed section of the marginal edge portion 16 of the back door panel 12. Therefore, the strength with which the bracket 40 is fixed to the back door panel 12 is able to be improved compared to a structure in which this bracket 40 is not fixed to the inner panel 20 by a mechanical fastening.

Further, the hole 36 that exposes a portion of the bracket 40 is formed in the linear joining portion 38 on the marginal edge portion 16 (i.e., the front end portion 34 of the outer panel 30) of the back door panel 12. Therefore, when the peripheral edge portion 18A of the back window glass 18 is joined by the adhesive G to the joining portion 38 on the front end portion 34 (a general attachment portion) of the outer panel 30, the peripheral edge portion 18A of the back window glass 18 is also joined by the adhesive G to a portion (a secure attachment portion) of the bracket 40 that is exposed by the hole 36.

Here, the adhesive G provides greater adhesive strength with glass and metal than it does with glass and resin material. Therefore, the adhesive strength of the back window glass 18 to the back door panel 12 is able to be improved, and reliability after adhesion is able to be improved. That is, adhesive failure between the back window glass 18 and the back door panel 12 is able to be reduced (or eliminated), so it is possible to ensure that the back window glass 18 will not fall off of the back door panel 12.

Also, the hinge for attaching the back door panel 12 to the vehicle body is fastened to the bracket 40, so at least two (i.e., a plurality of), e.g., a left and right pair of, brackets 40 are fixed inside the closed section of the marginal edge portion 16, as shown in FIG. 1. Therefore, the adhesive strength between the back door panel 12 and the back window glass 18 is able to be efficiently improved compared to a structure in which only one bracket 40 is fixed inside the closed section of the marginal edge portion 16. Regardless of the hinge portion, the bracket 40 and the hole 36 may be added to further improve the adhesive strength between the back door panel 12 and the back window glass 18.

Further, as described above, the hole 36 that exposes a portion of the bracket 40 is formed on the joining portion 38 of the marginal edge portion 16 (i.e., the front end portion 34 of the outer panel 30) to which the peripheral edge portion 18A of the back window glass 18 is joined. Therefore, compared to a structure in which this hole 36 is not formed on the joining portion 38 of the marginal edge portion 16 (i.e., the front end portion 34 of the outer panel 30), the linear joining portion 38 is not formed in a plurality of rows. Consequently, the structure of the marginal edge portion 16 (including the bracket 40) of the back door panel 12 is able to be simplified (without restricting the structure of the marginal edge portion 16).

Heretofore, the vehicle resin back door structure 10 according to the example embodiment has been described with reference to the drawings, but the vehicle resin back door structure 10 of the example embodiment is not limited to that shown in the drawings. That is, suitable design changes are possible within the scope of the invention. For example, the hole 36 may also be formed on the joining portion 38 of the marginal edge portion 16 (i.e., the front end portion 34 of the outer panel 30), as long as the structure of the marginal edge portion 16 of the back door panel 12 does not become complicated.

Also, if the bracket 40 is made of a lightweight metal that is strong and rigid, it is possible to provide only one bracket 40 extending in the vehicle width direction, for example, inside the closed section of the marginal edge portion 16. Therefore, the hole 36 is not limited to only one per bracket 40. That is, a plurality of holes 36 may be provided for one bracket 40.

Further, the shape of the hole 36 is not limited to the rectangular shape shown in the drawings. For example, the shape of the hole 36 may also be oblong or the like. Moreover, the second opening formed in the marginal edge portion 16 may be a notched portion, not shown, for example, instead of the hole 36. However, if the second opening is the hole 36, there is the advantage that a reduction in rigidity of the marginal edge portion 16 is able to be inhibited or prevented, compared with a structure in which the second opening is a notched portion.

Also, the bracket 40 is preferably fixed by a mechanical fastening such as a bolt or a rivet, but the bracket 40 is not limited to this structure. For example, the bracket 40 may be joined and fixed to the inner panel 20 by an industrial adhesive or the like that is reliable (i.e., that will not easily come off). Also, the back door panel 12 is not limited to being made of CFRP, and the bracket 40 is not limited to being made of iron.

Further, in this example embodiment, the marginal edge portion 16 of the upper side, i.e., the bracket 40 for fastening the hinge portion, is given as an example, but the vehicle resin back door structure 10 according to this example embodiment may also similarly be applied in the case of the marginal edge portions 17 on both sides, i.e., a bracket, not shown, for fastening a damper portion, also not shown. Moreover, this kind of joining method (adhesion ensuring method) may also similarly be applied to a window glass that is not able to be opened or closed, of a side door, not shown, for example.

What is claimed is:

1. A vehicle resin back door structure comprising:
    a back door panel made of resin, which has a first opening, and of which a marginal edge portion that forms the first opening is formed in a closed sectional shape;
    a bracket made of metal, which is fixed inside a closed section of the marginal edge portion, and of which a portion is exposed by a second opening formed in the marginal edge portion; and
    a back window glass that has an inner surface and an outer surface of which an inner peripheral edge portion is joined by an adhesive to the marginal edge portion and the portion of the bracket that is exposed by the second opening, wherein the adhesive directly contacts both the portion of the bracket and the inner surface of the back window glass via the second opening, and the outer surface is free from the back door panel and the bracket.

2. The vehicle resin back door structure according to claim 1, wherein
    the second opening is formed on a joining portion of the marginal edge portion to which the inner peripheral edge portion of the back window glass is joined.

3. The vehicle resin back door structure according to claim 1, wherein
    a plurality of the brackets are fixed inside the closed section of the marginal edge portion.

4. The vehicle resin back door structure according to claim 1, wherein
    the bracket is fixed by a mechanical fastening inside the closed section of the marginal edge portion.

5. The vehicle resin back door structure according to claim 1, wherein the second opening is a hole.

\* \* \* \* \*